United States Patent [19]

Masui et al.

[11] Patent Number: 5,700,416
[45] Date of Patent: Dec. 23, 1997

[54] PRESS MOLDING OF THERMOPLASTIC RESINS

[75] Inventors: Shohei Masui, Osaka; Kanemitsu Oishi, Shiga; Kiyoshi Mitsui, Osaka, all of Japan

[73] Assignee: Sumitomo Chemical Company, Limited, Osaka, Japan

[21] Appl. No.: 793,329

[22] Filed: Nov. 15, 1991

Related U.S. Application Data

[63] Continuation of Ser. No. 206,304, Jun. 14, 1988, abandoned, which is a continuation of Ser. No. 829,114, Feb. 14, 1986, abandoned.

[51] Int. Cl.$^6$ ............................................. B29C 43/34
[52] U.S. Cl. ................... 264/325; 264/328.11; 425/150
[58] Field of Search ............................ 264/255, 325, 264/328.8, 328.11, 328.19, 40.1; 425/150, 555

[56] References Cited

U.S. PATENT DOCUMENTS

| | | | |
|---|---|---|---|
| 3,857,658 | 12/1974 | Muzsnay | 425/150 |
| 4,076,788 | 2/1978 | Ditto | 264/255 |
| 4,519,763 | 5/1985 | Matsuda et al. | 425/451.9 |
| 4,696,632 | 9/1987 | Inaba | 425/150 |

FOREIGN PATENT DOCUMENTS

| | | |
|---|---|---|
| 146721 | of 1981 | Japan . |
| 56-146721 | 11/1981 | Japan . |
| 101322 | of 1984 | Japan . |
| 59-101322 | 6/1984 | Japan . |
| 196321 | of 1985 | Japan . |
| 60-31929 | 2/1985 | Japan . |
| 60-196321 | 10/1985 | Japan . |
| 61-22917 | 1/1986 | Japan . |

*Primary Examiner*—Jill L. Heitbrink
*Attorney, Agent, or Firm*—Birch, Stewart, Kolasch & Birch, LLP

[57] ABSTRACT

A method for press molding a thermoplastic resin which includes the steps of supplying a resin melt in a cavity of an unclosed mold through at least one passage formed in a wall of the mold upper and lower halves of which are respectively attached to upper and lower platens of a vertically movable press so that the supplied resin melt contacts with surfaces of the upper and lower halves of the mold, pressing the resin melt in the mold by closing the mold so that the mold closing is still being carried out after the supply of the resin melt is finished or the mold closing is started at the same time as the supply of the resin melt is finished, and then cooling the molded resin in the mold.

9 Claims, 2 Drawing Sheets

PRESS MOLDING OF THERMOPLASTIC RESINS

This application is a continuation of application Ser. No. 07/206,304 filed on Jun. 14, 1988 which is a continuation of Ser. No. 06/829,114 filed Feb. 14, 1986, both now abandoned.

FIELD OF THE INVENTION

The present invention relates to a method for press molding a thermoplastic resin. More particularly, it relates to a method for press molding a thermoplastic resin under moderate molding conditions such as a comparatively low temperature and low pressure at a large production rate by means of simple and inexpensive equipment to provide a molded article having good surface conditions.

BACKGROUND OF THE INVENTION

A press molded article, which is produced by melting and plasticating a thermoplastic resin, pressing the resin melt in a mold and cooling it, has the following advantages over an injection molded article:

In injection molding, since the resin melt is injected in a closed cavity of a mold through a gate, the resin is orientated and the molded article has residual internal strain or permanent set so that the article tends to suffer from deformation such as twist or distortion. The residual internal strain is larger in a part of the article near the gate than in other parts, thus resulting in mechanical weakness of the article. On the contrary, since in press molding, the resin melt in the mold is molded with uniform spreading of the resin over the mold surface by pressure generated by mold closing, the molded article has substantially no residual strain so that it suffers less deformation. Further, the pressure is applied in a direction of the thickness of the article, emboss and grooves are well transferred to the article surface. The pressurizing of the article during cooling prevents sink marks.

In conventional press molding, it is essential to adequately select a supply method of the resin melt into the cavity of the mold, and a design of the mold, to timely carry out the supply of the resin melt and the mold closing. In other words, if these requirements are not satisfied, it is not possible to produce molded articles with good appearance and mechanical properties at a high production rate, namely in a large production cycle.

One of the supply methods of the resin melt into the cavity of the mold comprises supplying the resin melt on a lower half of the mold from a front end of an extruder which is inserted between the upper and lower halves of the mold or from a front nozzle of an accumulator which reserves the resin plasticated by the extruder, which front nozzle is inserted between the upper and lower halves of the mold (cf. Japanese Patent Kokai Publication (unexamined) No. 146721/1981). In this method, however, the front end of the extruder or the front nozzle of the accumulator should be inserted between the upper and lower halves of the mold in each molding cycle. Therefore, this method takes longer so that productivity is unfavorably reduced. In addition, since it takes a comparatively long time from the start of the resin supply into the mold until the start of molding of the resin by press pressure, a portion of the molded article which is contacted to the mold surface tends to suffer from uneven gloss or trouble such as wrinkles (hereinafter referred to as "cold marks").

Another method for supplying the resin melt in the mold comprises conveying a desired amount of bulk resin melt to near the mold by means of, for example, a belt conveyer and charging the resin bulk on the lower half of the mold by picking it up with a suitable tool. In this method, it takes a comparatively long time for moving the tool between the conveyer and the mold. In addition, it is difficult to supply a resin melt having a low viscosity by this method. If the resin melt has a low viscosity it sticks on the supplying tool and/or the conveyer so that it is impossible to quickly supply a desired amount of the resin melt on the lower half of the mold. When the resin melt has a high viscosity, a large press pressure is required to mold it.

To overcome the drawbacks of the above described methods, there is proposed a method for supplying the resin melt to the mold comprising supplying the resin melt in the cavity of the lower half of the mold through passages arranged in the wall of the mold which is attached to a lower platen of a press (cf. Japanese Patent Kokai Publication (unexamined) No. 101322/1984). In contrast to the above methods, it is not necessary to insert the means for supplying the resin melt between the upper and lower halves of the mold and it is easy to handle the resin melt even the viscosity of the resin is low. Therefore, the time from the start of the resin supply until the start of molding of the resin by press pressure can be shortened so that cold marks less are formed and lower press pressure can be used. This method, however, cannot produce a molded article with less deformation and good appearance at a large production rate if the resin melt is not adequately supplied to the mold or the supply conditions are not suitably selected.

It is also proposed to select a specific compression ratio when polyolefin resin is molded in the form of a plate by an improved injection press molding method (cf. Japanese Patent Kokai Publication (unexamined) No. 196321/1985). According to this method, a molded article having less warpage, twist and sink marks may be produced. However, the mode of the mold closing and the way and conditions of supplying the resin melt are not specified. Therefore, it is difficult to produce a molded article having excellent appearance yet no cold marks.

SUMMARY OF THE INVENTION

One object of the present invention is to provide an improved method for press molding a thermoplastic resin at a large production rate.

Another object of the present invention is to provide an improved method for press molding a thermoplastic resin to produce a molded article with a better surface having less cold marks.

A further object of the present invention is to provide an improved method for press molding a thermoplastic resin, which method can be carried out by simple and inexpensive equipment.

DETAILED DESCRIPTION OF THE INVENTION

Figure 1:
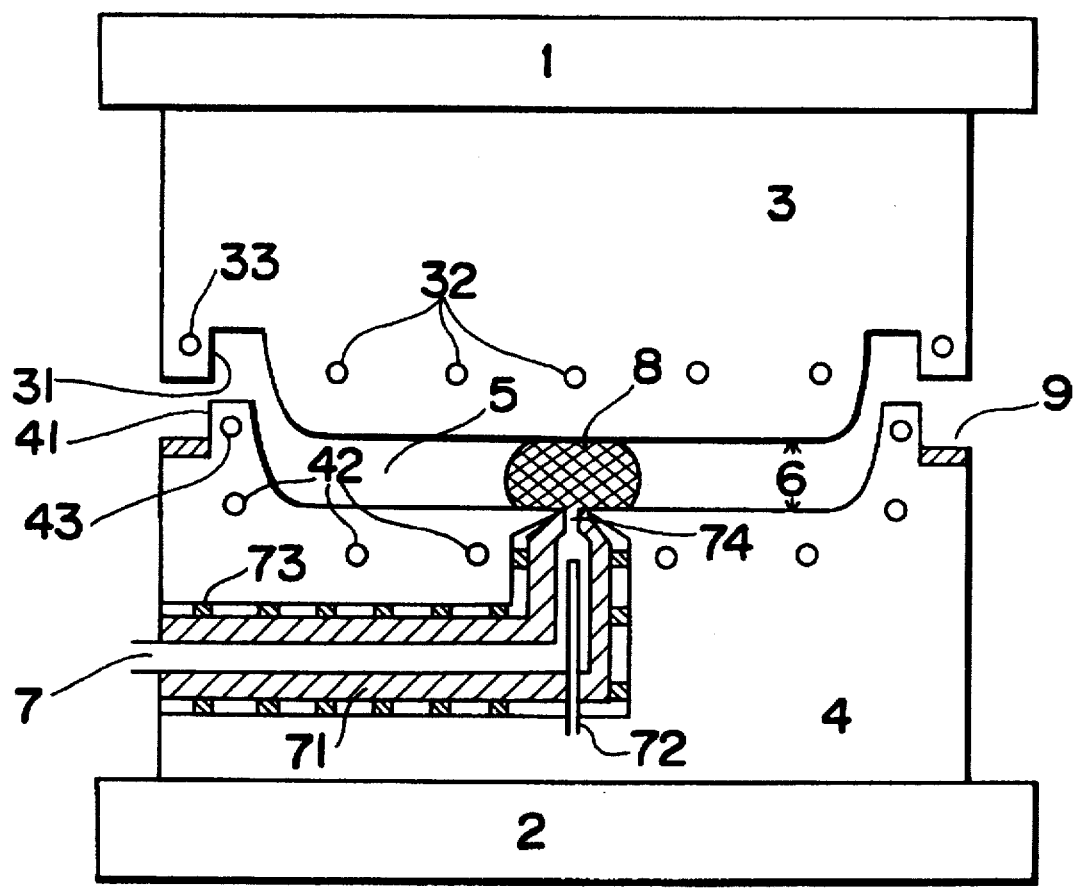
FIG. 1 schematically shows a cross section of one embodiment of a mold to be used according to the present invention.

According to the present invention, there is provided a method for press molding a thermoplastic resin comprising supplying a resin melt in a cavity of an unclosed mold through at least one passage formed in a wall of one of the molds upper and lower halves which are respectively attached to upper and lower platens of a vertically movable press so that the supplied resin melt contacts with the surfaces of the upper and lower halves of the mold, pressing the resin melt in the mold by closing the mold so that the mold closing is still being carried out after the supply of the resin melt is finished or the mold closing is first started at the same time the supply of the resin melt is finished, and then cooling the molded resin in the mold.

Preferably, the supply of the resin melt on the surfaces of the mold is started when clearance of the cavity is not larger than 50 mm and finished when the clearance reaches a distance of (t+0.1) mm or larger when t is not less than 5.0 mm, or (t+1/2t) mm or larger when t is less than 5.0 mm and not less than 1.0 mm, or 1.5 mm or larger when t is less than 1.0 mm ("t" stands for a thickness of the molded article). If the supply of the resin melt is started when the clearance is larger than 50 mm, the cold marks easily appear on the surface of the molded article. Further, concentric circular lines (hereinafter referred to as "ring marks") are formed around a part of the article surface corresponding to a supply aperture for the resin melt and thereby a less valuable molded article with poor appearance is produced.

If the clearance of the cavity is less than the above limit when the supply of the resin melt is finished, the molded article is twisted, and also concentric circles (hereinafter referred to as "flow marks") are formed around a part of the article surface corresponding to the supply aperture. Thereby, the molded article has poor appearance. To avoid such surface defects (e.g. cold marks, ring marks or flow marks) and twist or warpage of the article, the clearance of the cavity is selected in the above range during the resin supply. When the mold is kept at a relatively low temperature so as to further increase the production rate, preferably the supply of the resin melt is started when the clearance is not larger than 20 mm and finished when the clearance reaches a distance of (t+0.2) mm or larger when t is not less than 5.0 mm, or (t+1/t) mm or larger when t is less than 5.0 mm and not less than 1.0 mm, or 2.0 mm or larger when t is less than 1.0 mm. When the resin melt is supplied under the above condition, a molded article having good appearance and no twist or warpage is produced even at a comparatively low molding temperatures.

According to the present invention, a mode of mold closing is as important as the clearance of the cavity during the supply of the resin melt. One cycle of molding starts after the molded article produced in the previous cycle is removed from the mold. At the beginning, the mold is closed at a comparatively high rate until the clearance reaches the distance suitable for the supply of the resin melt as discussed above. Then, the mold closing is interrupted and the supply of the resin melt is started. When or just before the supply of the resin melt is finished, the mold closing is restarted. Instead of interrupting the mold closing, the mold closing is decelerated, the resin melt is supplied in the mold cavity and then the mold closing is accelerated simultaneous with or just before the supply of the resin melt finishes. To prevent the formation of the cold marks and to produce the molded article having a good appearance without ring marks or flow marks, the latter mode of the mold closing is preferred.

Back flow of the resin in the pressing step can be prevented by mechanically closing the supply passage or cooling at least a part of the supply passage so as to lower the temperature of the resin to render it in a nonflowable state after the supply of the resin melt is completed.

When a large and/or complicated article is molded by the method of the invention, one supply passage may not be enough to supply a sufficient amount of the resin. In such case, two or more supply passages can be arranged in the walls of the upper and/or lower halves of the mold. The supply passages should be so arranged that the flows of the resin melt join each other before the mold is closed. By this measure, since the joined portion of the resin is pressed in the direction of the thickness, the molded article does not have a poor appearance or weak strength, which is usually found at the joined portion of the injection molded article.

In the present press molding invention, there may be used a pair of male and female molds which are closed by slidingly moving the outer side of the male mold and an inner side of the female mold. In this case, formation of flash near the slidingly moving parts of the male and/or female molds is prevented by locally cooling at least one of said parts. Alternatively, the formation of the flash is effectively prevented by providing an elastomeric material around the periphery of the male and/or female molds so that the elastomeric material contacts with the mold to form sealing prior to the complete closing of the mold.

The preferred embodiments of the present invention will now be described, by way of example, with reference to the accompanying drawings.

FIG. 1 is a schematic cross section of one embodiment of a mold to be used for molding a flanged box-shaped article. FIG. 1 shows a typical mode of supplying the resin melt according to the present invention. In FIG. 1, numeral 1 stands for a bottom plate of an upper half of the mold; 2 stands for a bottom plate of a lower half of the mold; 3 stands for an upper half of the mold; 4 stands for a lower half of the mold; 5 stands for a cavity of the mold; 6 stands for a distance of clearance of the cavity; and 7 stands for a passage for the resin melt the left end of which is connected to a supplier of the resin melt (not shown) and the other end of which opens to the cavity 5. The mold is so arranged that the inner side 31 of the upper half 3 and the outer side 41 of the lower half 4 of the mold are slidingly moved to close the mold. In a metal block 71 which defines the supply passage 7, a heater and a sensor are installed (not shown) to control the temperature of the resin melt to be transferred. A piston 72 is moved up and down by means of a hydraulic cylinder (not shown) connected to the bottom end of the piston 72. In FIG. 1, the piston 72 is in its lowest position so that the passage 7 opens to the cavity 5. The metal block 71 is fixed on the lower half 4 of the mold at several fixing points 73. An insulating layer may be inserted between the block 71 and the lower half 4 of the mold so that the heat is not conducted from the block 71 to the lower half 4 of the mold, namely the temperature of the lower half 4 of the mold is not raised by the heat generated by the heater in the block 71. A quantity of the resin melt 8 is being supplied from the supplier (not shown) to the cavity 5 through the passage 7.

When the supply of the resin melt is completed and stopped, the piston 72 is simultaneously started to move upwardly so that the the upper tip of the piston 72 reaches a position 74 and the top surface of the piston is on substantially the same level as that of the surface of the lower half 4 of the mold. Thereby, the passage 7 and the cavity 5 are disconnected and press molding is ready to start. A spacer 9 made of a metal plate defines a thickness of the bottom part of the molded article. In pipes 32, 33, 42 and 43, a heat transfer liquid (e.g. water) is circulated for controlling the temperature of the mold.

An element from which the resin melt is supplied into the cavity of the lower half 4 of the mold may be the same one as used in the injection molding such as a hot runner block or a hot nozzle. During injection molding, the resin melt is extruded from said element under high pressure in a closed cavity of a mold in the press molding according to the present invention, the resin melt is extruded from the element under relatively low pressure into the unclosed cavity of the mold and uniformly spread on the surface of the mold and molded by press pressure so that the orientation of the resin and molding strain, which are often found in the injection molded article are not found in the article molded according to the present invention.

In the embodiment of FIG. 1, the passage of the resin melt is closed by moving the piston 72 by a hydraulic press. Alternatively, the passage may be closed by mechanically closing the supply aperture or a part of the passage near the mold by utilizing elongation and contraction of a spring caused by pressure of the supplied resin mold, or by closing the passage by means of a selector valve. Further, the passage may be thermally closed by solidifying the resin in it by cooling the resin. Two or more of these measures may be combined to effectively close the passage.

The supplier of the resin melt to be employed according to the present invention may be the same one as used in the conventional injection molding such as a screw in-line type supplier or a screw preplasticating plunger type supplier in which an extruder and an accumulator are combined.

Details of press molding according to the present invention will be further explained by making reference to FIG. 1.

Firstly, the mold closing is started, the upper and lower halves of which are respectively fixed to the upper and lower platens of the press which vertically move. For carrying out the molding in high molding cycle, the mold is closed preferably at a rate of 100 to 300 mm/sec. The mold closing is then interrupted or decelerated to a rate of less than 30 mm/sec., preferably less than 10 mm/sec., and the the resin melt is supplied through the passage. By the interruption or deceleration of the mold closing, the supplied resin melt is firmly contacted with the surfaces of the upper and lower halves of the mold. The supply of the resin melt is started when the clearance of the cavity reaches 50 mm or less, preferably 20 mm or less and finished when the clearance reaches a distance of (t+0.1) mm or larger, preferably (t+0.2) mm or larger when t is not less than 5.0 mm, or (t+1/2t) mm or larger, preferably (t+1/t) mm or larger when t is less than 5.0 mm and not less than 1.0 mm, or 1.5 mm or larger, preferably 2 mm or larger when t is less than 1.0 mm, "t" being the thickness of the article to be molded. As understood from the above, when the thickness of the article is thin, the ratio of the clearance of the cavity to the thickness of the article is made larger in the above range than when the thickness of the article is thick. For example, when the thickness of the article is 1 mm, the clearance of the cavity is preferably from 2.0 to 5.0 mm, while when the thickness is 5 mm, the clearance of 5.1 to 5.2 mm does not result in the orientation of the resin so that the molded article does not suffer from deformation or poor mechanical properties.

To effectively prevent the formation of the cold marks on the molded article, it is advisable to supply the resin melt at a high supply rate when the clearance of the cavity is as small as possible in the range in which the molded article has less orientation and deformation, transfer of the emboss and grooves is improved and the formation of the sink marks is prevented.

When or just before the supply of the resin melt is finished, the mold closing is restarted to complete the press molding in case of interrupting the mold close.

In case of decelerating the mold closing, the mold closing is continued during the supply of the resin melt. Although the mold closing may be continued at the decreased rate, the mold closing is preferably accelerated to complete the press molding when or just before the supply of the resin melt is finished.

Thereafter, the molded article in the mold is cooled. Then, the mold is opened to remove the molded article therefrom.

In each of the above steps, the rate of the mold closing is not necessarily constant, and may be continuously or step wise changed.

According to the present invention, the resin melt is supplied into the cavity of the unclosed mold through the passage arranged in the wall of the mold so as to contact with the surfaces of the upper and lower halves of the mold by adjusting the timing of the supply of the resin and the mold closing. Further, since the mold is being closed after the supply of the resin melt is finished, the press molding of the resin begins and the resin starts to spread over the cavity surface substantially simultaneously with the finishing of the supply of the resin. As discussed below, in the press molding of the thermoplastic resin, it is very important to shorten a period from the start of the supply of the resin melt until the start of the press molding and spreading of the resin.

When the resin melt is supplied to the mold cavity and molded by the press pressure to form the molded article, a portion of the resin melt contacting the cavity surface of the mold is deprived of its heat energy and cooled. The supplied resin melt is spread from the center portion to the periphery of the cavity surface by resin pressure and/or pressure generated by the mold closing and molded. In comparison with the spread and molded resin portion, the portion of the resin firstly supplied and contacted with the mold surfaces is cooled under such condition that the clearance of the cavity is very large and enough pressure is not applied to the resin. Therefore, a part of the molded article made of the firstly supplied portion of the resin tends to have wrinkles, warpage or cold marks. The formation of the cold marks can be prevented by shortening the period from the supply of the resin melt in the mold cavity until the beginning of the spreading of the resin by the resin pressure and/or the pressure generated by the mold closing. According to the present invention, this period is made substantially zero (0) by adjusting the timing of the supply of the resin melt and the mold closing so that the molded article having a smaller wall thickness and a larger spreading area but having no cold mark or less deformation is produced.

In the conventional press molding, it was proposed to directly supply the resin melt on the surface of the mold cavity from, for example, an accumulator through a nozzle and the like. In this method, since the nozzle should be inserted in the cavity and removed therefrom, it takes a long time so that the cold marks are formed on the molded article. In case of supplying the resin melt through the passage arranged in the mold wall, if the conditions defined by the present invention are not satisfied, namely the resin melt is supplied with contacting only the surface of the upper or lower half of the mold, the cold marks tend to be formed. When the contact of the resin to the surface is not enough, the formation of the cold marks is not effectively prevented. In such cases, the formation of the cold marks is substantially prevented by heating the mold to a comparatively high temperature. At such high temperature, it takes a longer time to cool and solidify the resin in the mold so that a period of time of one molding cycle becomes unpractical. On the contrary, according to the present invention, the formation of the cold marks are prevented even at a lower molding temperatures, since the timing of the resin supply is so adjusted that the resin is supplied on the mold with contact with the surface of the mold and it starts to flow as soon as it is supplied on the mold.

It is important in one embodiment that the mold closing be carried out just after the supply of the resin melt is finished. The supplied resin melt continuously spreads over the surface of the mold cavity in a ring form. If the mold closing is not carried out after the supply of the resin melt is finished, the spreading of the resin melt temporarily stops so that the ring mark is formed in this part. According to the present invention, since not only the resin supply is finished in a short period of time but also the resin is press molded at a low temperature, the molding time can be reduced and molded articles having good appearance can be produced at a high production rate.

In addition, the present invention preferably utilizes a vertically movable press.

If the press molding according to the present invention is carried out by means of a horizontally movable press instead of the vertically movable one and the resin melt is supplied into the unclosed mold, there arises the following drawbacks:

Although when the size of the molded article is small or when the viscosity of the resin melt is high, the supplied resin can be press molded by the horizontally movable press, when the size of the molded article is large and the amount of the supplied resin is large or when the viscosity of the resin melt is low, the supplied resin melt flows down by its own weight. Therefore, some special measure should be taken to prevent the flow of the resin or the position of supply aperture and supplying rate should be specially arranged.

Since the vertically movable press is used according to the present invention, the molds can be attached in a vertical direction and the supply aperture can open horizontally or substantially horizontally so that the drawbacks of the horizontally movable press are overcome.

Now, comparison will be made between the method in which the mold closing is interrupted during the resin supply (hereinafter referred to as an "interruption method") and the method in which the mold closing rate is decreased during the resin supply (hereinafter referred to as a "continuous method").

When the hydraulic press is employed, the temporal interruption of the mold closing is effected by stopping the supply of oil in the hydraulic cylinder. Then, the press exerts no pressure. If the resin melt is supplied in such a state, the movable platen is shifted by the supply pressure of the resin melt and the contact pressure of the resin melt against the mold surface is decreased so that the effect of preventing the formation of the cold marks is deteriorated in comparison with the continuous method. Therefore, the interruption method requires higher temperature of the mold than the continuous method.

When the resin melt is supplied at a constant rate, a linear speed of the resin spread in the radial direction always decreases as the time passes in the interruption method while, in the continuous method, the linear speed can be made substantially constant by adjusting the mold closing rate since the clearance of the mold cavity decreases as the time passes.

The status of the molding around the finishing of the resin supply will be explained.

If the mold closing is not being carried out after the resin supply is finished, the spreading of the resin melt temporarily stops so that the ring mark is formed in the molded article as described in the above. The ring mark is formed not only when the mold closing is completely interrupted but also when the mold closing rate is discontinuously decreased. Accordingly, in the continuous method, it is preferred to increase the mold closing rate when or just before the supply of the resin melt is finished. Some preferred modes for operating the mold closing will be explained in detail in the examples described later.

During the press molding of the supplied resin melt, the back flow of the resin from the cavity to the supply aperture is substantially prevented by maintaining the screw or a plunger of the supplier in its forward position. For more effectively preventing the back flow of the resin, it is preferred to mechanically and/or thermally close the passage of the resin at a position as near as possible to the supply aperture as described in the above.

FIG. 1 shows an embodiment in which the passage of the resin is arranged in the wall of the lower half of the mold, although the passage may be formed in the wall of the upper half of the mold. The size and shape of the article to be molded has their own limit according to the kind of the resin to be molded and the molding conditions when the resin melt is supplied from only one supply aperture. Therefore, an article having larger size or more complicated shape than such limits is molded by using at least two supply apertures. In such case, the apertures are positioned so that the streams of the resin melt join together before the mold is closed. Thereby, the joined part of the resin is pressed in the direction of the thickness of the article and integrated so that the molded article has good appearance and mechanical properties.

Usually, the mold is closed by slidingly moving the outer side or inner side of the male mold and the inner side or outer side of the female mold. In some cases, the thermoplastic resin melt flows between the sliding parts of the molds to form the flash. The formation of the flash can be prevented by decreasing the clearance of the mold cavity to a level smaller than a limit determined from the viscosity characteristics of the thermoplastic resin to be molded, the molding conditions and the like. When the resin has a high melt viscosity, the clearance may be made large to prevent the formation of the flash. Therefore, the formation of the flash can be easily prevented even if the mold accuracy is insufficient or if the parallelism of the platens of the press and/or the temperature control of the mold are not good. However, when a resin having a low melt viscosity such as high flow grade polypropylene is to be molded, the clearance of the mold cavity should be made small to prevent the formation of the flash. Therefore, the mold should be accurately made and the parallelism of the platens and temperature control should be accurate.

Since the formation of the flash is particularly influenced by the temperature of the sliding parts of the male and female molds, it is effective to partially cool a portion near the sliding part of the male and/or female molds. Thereby, the formation of the flash is prevented even when the mold having comparatively large clearance is used. The formation of the flash may be prevented by cooling the whole mold, but the low temperature of the mold results in the poor flowing of the resin melt and in turn the formation of the cold marks.

PREFERRED EMBODIMENTS OF THE INVENTION

Practical and presently preferred embodiments of the present invention are shown in the following examples.

Examples 1–11 and Comparative Examples 1–4

According to the press molding method of the present invention, polypropylene (PP), acrylonitrile-butadienestyrene (ABS) resin and polymethyl methacrylate (PMMA) were press molded.

The molded article was produced by means of the press mold equipment shown in FIG. 1 and had a wall thickness of 1.0 mm, 1.5 mm, 2.0 mm or 5.0 mm.

The interruption and continuous methods were compared with changing the clearance of the mold cavity during supplying the resin melt, the mold temperature, the mold closing rate and time lag between the resin supply and the restart or acceleration of the mold closing.

The molded articles were examined for the presence of deformation (twisting), cold marks, ring mark and flow marks.

The results are shown in the Table, in which the appearance of the molded article was evaluated as follows:
G: Good
F: Fair
P: Poor.

supplied when the clearance 6 of the main parts of the mold cavity reached 4 mm. A molded article having no flash was produced.

Comparative Example 5

In the same manner as in Example 12 but not circulating 20° C. water through the pipes 33 and 43, the molded article having flash was produced.

Example 13

Figure 2A:
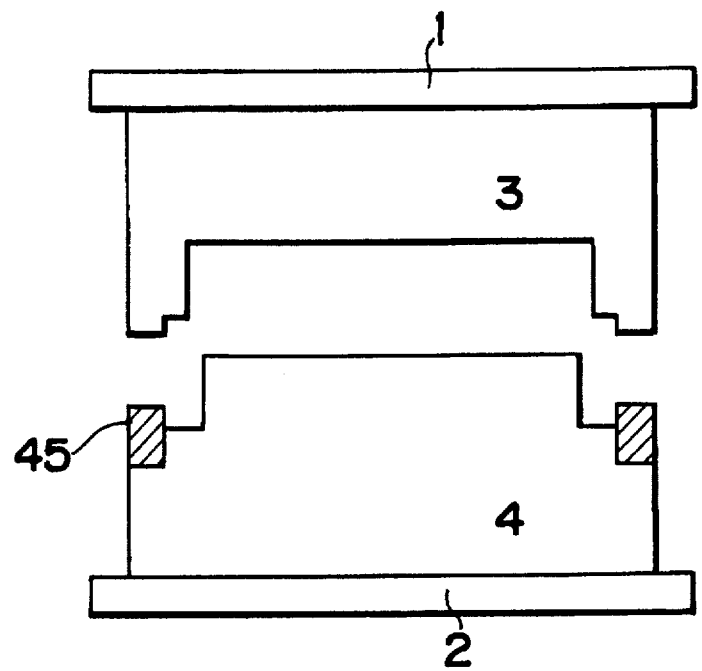
FIGS. 2A, 2B and 2C schematically show cross sections of another embodiment of a mold to be used according to the present invention in various stages of mold closing.
Figure 2B:
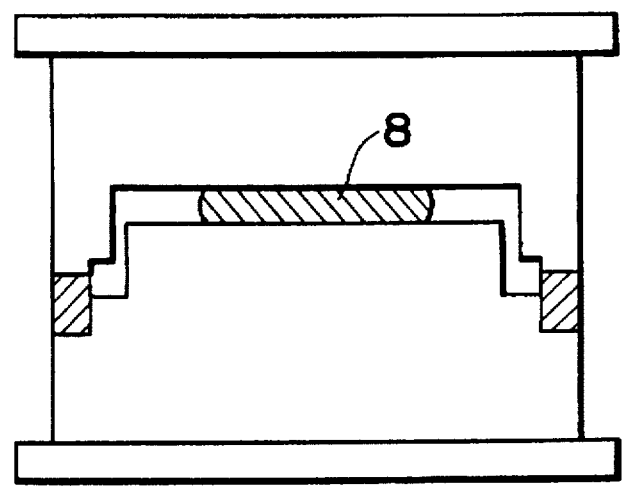
Figure 2C:
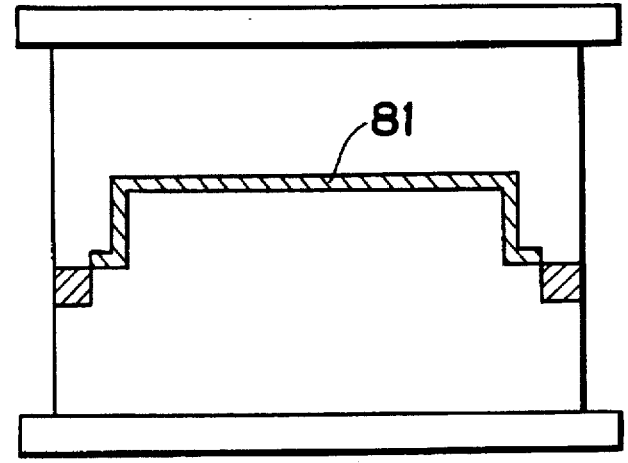

The formation of the flash can be prevented by supplying an elastic material around the periphery of the male and/or female molds so that the elastic material contacts with and seals the mold prior to the complete closing of the mold. This embodiment is schematically shown in FIGS. 2A to 2C, in which a polyurethane rubber ring 45 surrounds the periphery of the lower half of the mold (male mold). The ring 45 contacts with the upper half of the mold (female mold) when the mold is closed in a state shown in FIG. 2B. As the mold is further closed from the state of FIG. 2B, the ring 45 is compressed and the mold closing is completed in a state shown in FIG. 2C.

TABLE

| | | | | Molding conditions | | | | | | | | |
|---|---|---|---|---|---|---|---|---|---|---|---|---|
| Ex-ample No. | Resin | Thickness of article (mm) | Mode of resin supply | Clearance of cavity (mm) A[2] / B[3] | Mold closing rate during resin supply (mm/sec.) | Mold closing rate during press molding (mm/sec.) | Time lag[1] (sec) | Mold Temp (°C.) | Appearance of article | | | |
| | | | | | | | | | Cold mark | Ring mark | Flow mark | Defor-mation |
| 1 | PP[4] | 1.5 | I[5] | 40 / 40 | — | 30 | −0.5 | 110 | F | G | G | G |
| 2 | ↑ | ↑ | ↑ | 20 / 20 | — | ↑ | ↑ | 90 | F | G | G | G |
| 3 | ↑ | ↑ | ↑ | 6 / 6 | — | ↑ | −0.1 | 80 | G | G | G | G |
| 4 | ↑ | ↑ | ↑ | 1.9 / 1.9 | — | ↑ | ↑ | 70 | G | G | F | F |
| 5 | ↑ | ↑ | C[6] | 20 / 2.5 | 15 | 15 | −0.1 | 70 | G | G | G | G |
| 6 | ↑ | ↑ | ↑ | 8 / ↑ | 5 | 30 | ↑ | ↑ | G | G | G | G |
| 7 | ↑ | ↑ | ↑ | ↑ / ↑ | 0.5/10 | 18/30 | ↑ | ↑ | G | G | G | G |
| 8 | ↑ | 1.0 | ↑ | 4 / 2.0 | ↑ | 30 | ↑ | ↑ | G | G | G | G |
| 9 | ↑ | 5.0 | ↑ | 6 / 5.2 | 0.5 | ↑ | ↑ | ↑ | G | G | G | G |
| 10 | ABS[7] | 2.0 | ↑ | 8 / 3.0 | 0.5 | ↑ | ↑ | ↑ | G | G | G | G |
| 11 | PMMA[8] | ↑ | ↑ | ↑ / ↑ | ↑ | ↑ | ↑ | ↑ | G | G | G | G |
| Com 1 | PP[4] | 1.5 | I[5] | 55 / 55 | — | 30 | +0.5 | 110 | P | P | G | G |
| Com 2 | ↑ | ↑ | ↑ | 6 / 6 | — | ↑ | +1.0 | 80 | G | P | G | G |
| Com 3 | ↑ | ↑ | C[6] | 3 / 1.5 | 0.5 | ↑ | −0.1 | 70 | G | G | F | P |
| Com 4[9] | ↑ | ↑ | Injec. | 1.5 | — | — | — | ↑ | G | G | P | P |

Notes for Table:
[1] Time lag of restart or acceleration of the mold closing from finish of the resin supply: −: The mold closing being restarted or accelerated before finish of the resin supply. +: The mold closing being restarted or accelerated after finish of the resin supply.
[2] When the resin supply is started.
[3] When the resin supply is finished.
[4] Noblen (trade mark) AH561 (melt index = 3) manufactured by Sumitomo Chemical.
[5] Interruption method.
[6] Continuous method.
[7] Chlarastic (trade mark) SHF.
[8] Sumipex B (trade mark) LO.
[9] The resin melt was supplied after the mold was completely closed as in the injection molding.

Example 12

By using the press molding equipment of FIG. 1, a molded article having a wall thickness of 1 mm was produced.

The clearance between the sliding parts of the male and female molds was 0.05 mm. Through the pipes 32 and 42, water heated at 85° C. was circulated, and through the pipes 33 and 43, water kept at 20° C. was circulated. Polypropylene (Noblen AY564 (trade mark) manufactured by Sumitomo Chemical. Melt index=15) heated to 240° C. was By this mode of press molding, a molded article having no flash is produced.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for press molding a thermoplastic resin to produce a molded article comprising:

providing an unclosed mold having upper and lower halves, initiating closing of said upper and lower halves of said mold, decelerating said mold closing to a rate of less than 30 mm/sec., supplying a resin melt of said thermoplastic resin to a cavity of said unclosed mold comprising said upper and lower halves through at least one passage formed in a wall of said mold, said upper and lower halves being respectively attached to upper and lower platens of a vertically movable press such that introduction of said resin melt to said cavity is started when clearance of said cavity is not greater than 50 mm and completed when the clearance reaches a distance of (t+0.1) mm or larger when t is not less than 5.0 mm, or (t+1/2t) mm or larger when t is less than 5.0 mm and not less than 1.0 mm, or 1.5 mm or larger when t is less than 1.0 mm, "t" being the thickness of said molded article, pressing said resin melt in said mold by closing said upper and lower halves of said mold without interruption of said closing of said mold from the completion of supply of said resin melt until completion of said mold closing, and cooling the molded resin in said mold.

2. A method according to claim 1, wherein the supplying of the resin melt to a cavity of the mold is started when clearance of the cavity is not larger than 20 mm and finished when the clearance reaches a distance of (t+0.2) mm or larger when t is not less than 5.0 mm, or (t+1/t) mm or larger when t is less than 5.0 mm and not less than 1.0 mm, or 2.0 mm or larger when t is less than 1.0 mm, "t" being a thickness of the molded article.

3. A method according to claim 1, wherein the passage from which the resin melt is supplied is thermally closed by cooling a part of the passage to solidify the resin in said part after the supply of the resin melt is finished.

4. A method according to claim 1, wherein the resin melt is supplied from at least two passages which are arranged in the mold so that streams of the resin melts therefrom join together before the mold is closed.

5. The method according to claim 1, wherein the mold closing is accelerated simultaneous with or before completion of supplying the resin melt.

6. A method for press molding in a thermoplastic resin comprising:

providing an unclosed mold having upper and lower halves, initiating closing of said upper and lower halves of said mold, interrupting said mold closing, supplying a resin melt of said thermoplastic resin to a cavity of said unclosed mold comprising said upper and lower halves through at least one passage formed in a wall of said mold, said upper and lower halves being respectively attached to upper and lower platens of a vertically movable press such that introduction of said resin melt to said cavity is started when clearance of said cavity is not greater than 50 mm and completed when the clearance reaches a distance of (t+0.1) mm or larger when t is not less than 5.0 mm, or (t+1/2t) mm or larger when t is less than 5.0 mm and not less than 1.0 mm, or 1.5 mm or larger when t is less than 1.0 mm, "t" being the thickness of said molded article, pressing said resin melt in said mold by restarting the closing of said upper and lower halves of said mold, before the supplying of the resin is finished, until completion of mold closing without further interruption of said closing of said mold following completion of the supplying of said resin melt, and cooling the molded article in said mold.

7. A method according to claim 6, wherein the supplying of the resin melt to a cavity of the mold is started when clearance of the cavity is not larger than 20 mm and finished when the clearance reaches a distance of (t+0.2) mm or larger when t is not less than 5.0 mm, or (t+1/t) mm or larger when t is less than 5.0 mm and not less than 1.0 mm, or 2.0 mm or larger when t is less than 1.0 mm, "t" being a thickness of the molded article.

8. A method according to claim 6, wherein the passage from which the resin melt is supplied is thermally closed by cooling a part of the passage to solidify the resin in said part after the supply of the resin melt is finished.

9. A method according to claim 6, wherein the resin melt is supplied from at least two passages which are arranged in the mold so that streams of the resin melts therefrom join together before the mold is closed.

* * * * *